United States Patent
Todd

(10) Patent No.: US 7,203,705 B2
(45) Date of Patent: Apr. 10, 2007

(54) LOCATION OF OBJECTS/SERVICES IN A DISTRIBUTED OBJECTS/SERVICES SYSTEM

(75) Inventor: Stephen J Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 10/394,324

(22) Filed: Mar. 20, 2003

(65) Prior Publication Data

US 2004/0122862 A1 Jun. 24, 2004

(30) Foreign Application Priority Data

Dec. 18, 2002 (GB) ................................. 0229540.0

(51) Int. Cl.
*G06F 17/30* (2006.01)
*G06F 7/00* (2006.01)
*G06F 17/00* (2006.01)

(52) U.S. Cl. ..................................... 707/104.1; 707/10

(58) Field of Classification Search .............. 707/104.1, 707/1–10, 100–102; 709/201
See application file for complete search history.

(56) References Cited

U.S. PATENT DOCUMENTS

| | | | |
|---|---|---|---|
| 6,651,109 B1 * | 11/2003 | Beck et al. ................. | 719/315 |
| 6,718,327 B1 * | 4/2004 | Edmonds ....................... | 707/8 |
| 6,944,662 B2 * | 9/2005 | Devine et al. .............. | 709/225 |
| 2004/0167932 A1 * | 8/2004 | Edmonds .................... | 707/200 |

OTHER PUBLICATIONS

Zundert, Rudd van. MQSeries cluster: a hands-on view, part 4. Sep. 11, 2002. The online journal for mainframe professionals. Issue 36.*
Shasha, Dennis. An introduction to MQSeries Messaging and Queuing. Distributed Computing. Fall 2000. G22.2631-001. Computer Science, New York University.*

* cited by examiner

Primary Examiner—Hosain Alam
Assistant Examiner—Usmaan Saeed
(74) Attorney, Agent, or Firm—Stephen J. Walder, Jr.

(57) ABSTRACT

The invention provides a system whereby both queues and objects/services in a messaging system can be located via the same mechanism (message clustering).

13 Claims, 3 Drawing Sheets

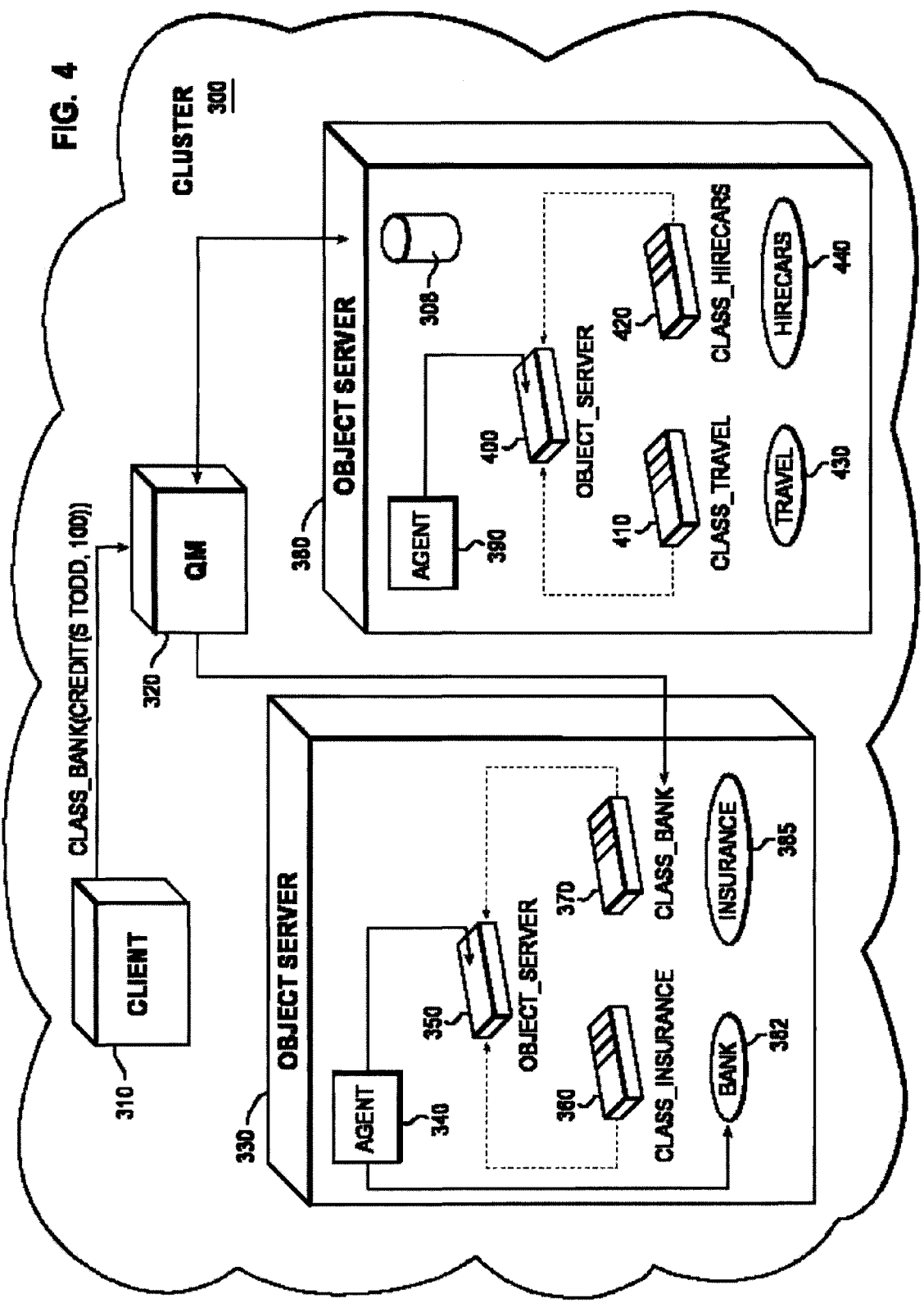

LOCATION OF OBJECTS/SERVICES IN A DISTRIBUTED OBJECTS/SERVICES SYSTEM

FIELD OF THE INVENTION

The invention relates to the field of distributed object/services systems and more particularly relates to the location of objects/services within such systems.

BACKGROUND OF THE INVENTION

A distributed object/services system typically consists of three major parts;
1) a mechanism to locate objects/services and object/services factories;
2) a data transmission format; and
3) a transport mechanism.

These three parts are generally implemented via very separate mechanisms. For example one could envisage a system in which an LDAP (Lightweight Directory Access Protocol) directory structure is used to locate objects/services; SOAP (Simple Access Object Protocol) is used as the data transmission format; and a messaging product such as IBM's WebSphere MQ is used as the transport mechanism.

FIG. 1 provides an overview of how a system with a separably maintainable directory structure typically functions. Client 10 requests an object/service 40 from server 20 (e.g. BANK). Server 20 performs a lookup in directory 30 and discovers that BANK resides on system 1.

Server 20 then issues a request to system 1 for the BANK service/object. This may involve calling a method on BANK and passing associated parameters (e.g. debit(S Todd, 100)).

Implementing each of the three mechanisms discussed above separately is both difficult and time-consuming. For example, implementing the mechanism to locate objects/services requires not only the creation and maintenance of a directory structure 30 but also code to provide fault-tolerance in the event of a directory failure. Such fault tolerance is often provided by keeping a backup copy of the directory in synchronisation with the primary copy (i.e. replication). In addition there are other considerations such as security.

Thus there is a need in the industry to reduce the overhead associated with the implementation of these three parts of a distributed object/services system.

SUMMARY OF THE INVENTION

Accordingly the invention provides in a first aspect a method for sending a request for a target service to perform an operation, the method comprising the steps of: receiving a request for a target service to perform an operation; creating a message for a message queue, the message being representative of the request, the message including an indication of the message queue and the operation to perform; determining the location of said message queue, said queue being a cluster queue in a messaging cluster; and sending the message to the queue, wherein the queue represents the target service.

Thus where a messaging system such as WebSphere MQ is used as the transport mechanism in a distributed services system, the infrastructure used to locate queues (i.e. message clustering) can be applied to locate the services in the distributed system. This therefore avoids the need to maintain a separate directory structure for the location of services. All the advantages provided by the messaging system will therefore preferably also apply to the location of services.

Preferably the queue is an alias queue which maps to a real queue.

According to a further aspect, the invention provides a system for requesting a target service to perform an operation, the system comprising: a target service; means for receiving a request for a target service to perform an operation; means for creating a message representative of the request, said message including an indication of the target service and the operation to perform; a queue representing the target service, said queue being a cluster queue in a messaging cluster; means for determining the location of said queue; means, responsive to determining the location of said queue, for sending the message to said queue; an agent for reading the message from said queue; and means for performing the operation against the target service.

Note, in one embodiment the agent performs the operation against the target service. In another embodiment, the agent passes the message to another component for performance of the operation.

Preferably the queue is an alias queue which maps to a real queue.

Preferably there are a plurality of alias queues, each queue representing a target service and mapping to the same real queue.

Preferably the agent reads messages from the real queue. Thus an agent program preferably reads messages relating to different services off the same queue. This is far easier to administer than having one agent reading from multiple queues or even multiple agents.

It will be appreciated that the invention may be implemented in computer software.

According to another aspect, the invention provides an apparatus for sending a request for a target service to perform an operation, the apparatus comprising: means for receiving a request for a target service to perform an operation; means for creating a message for a message queue, the message being representative of the request, the message including an indication of the message queue and the operation to perform; means for determining the location of said message queue, said queue being a cluster queue in a messaging cluster; and means for sending the message to the queue, wherein the queue represents the target service.

DESCRIPTION OF THE DRAWINGS

A preferred embodiment of the present invention will now be described, by way of example only, and with reference to the following drawings:

FIG. 4 shows the components of a distributed services/object system according to a preferred embodiment of the present invention.

DETAILED DESCRIPTION

Figure 1:
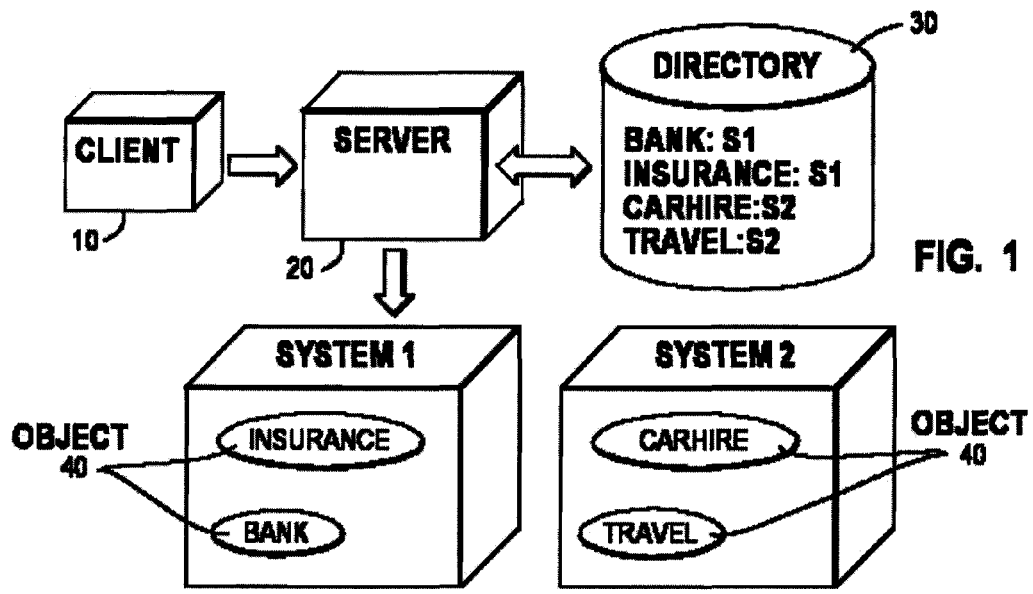
FIG. 1 shows an overview of how a system with a separably maintainable directory structure functions according to the prior art.
Figure 2:
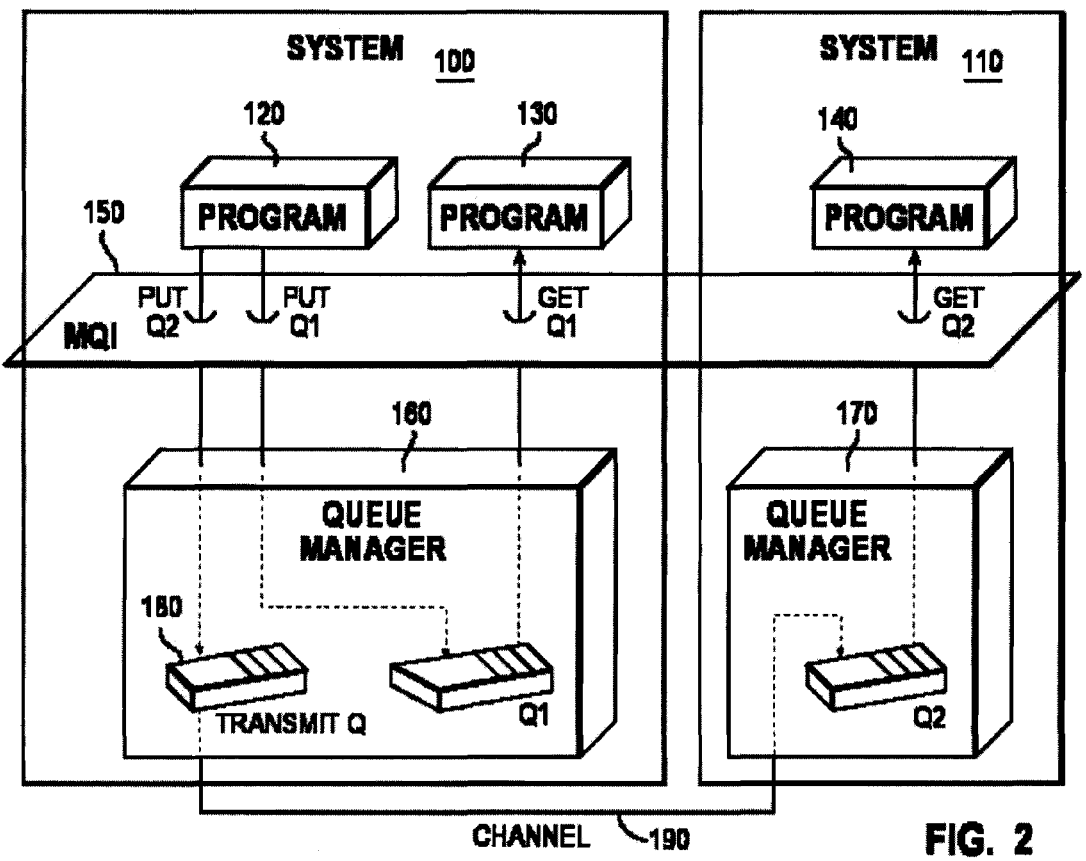
FIG. 2 illustrates a messaging system according to the prior art.

Messaging systems are well known in the art. As previously mentioned, one such system is IBM's WebSphere MQ. FIG. 2 provides an overview of how such a system operates.

System 100 executes programs 120 and 130. System 110 executes program 140. These programs communicate with queues 180; Q1; Q2 running on a queue manager 160; 170 via a message queuing interface (MQI) 150. For example, program 120 may wish to put a message to Q1 for retrieval by program 130. The program puts this request to its local queue manager 160 which immediately knows where Q1 is because it manages that queue. Thus the message can be put straight to Q1. On the other hand, program 120 (running in system 100) may wish to put a message to Q2 (running in system 110) for retrieval (GET) by program 140. In this instance Q2 is not local to the program's local queue manager 160. When it receives a request to put to Q2, queue manager 160 will look for a local definition of the remote queue (i.e. a pointer as to where to find Q2). Having found the local definition, the message is put to TransmitQ 180 for transfer via channel 190 to Q2 managed by queue manager 170. Once the message arrives at Q2, it is available for retrieval by program 140. Thus for every remote queue, it is necessary for a queue manager to maintain a local definition. This is of course imposes an administrative burden.

Figure 3:
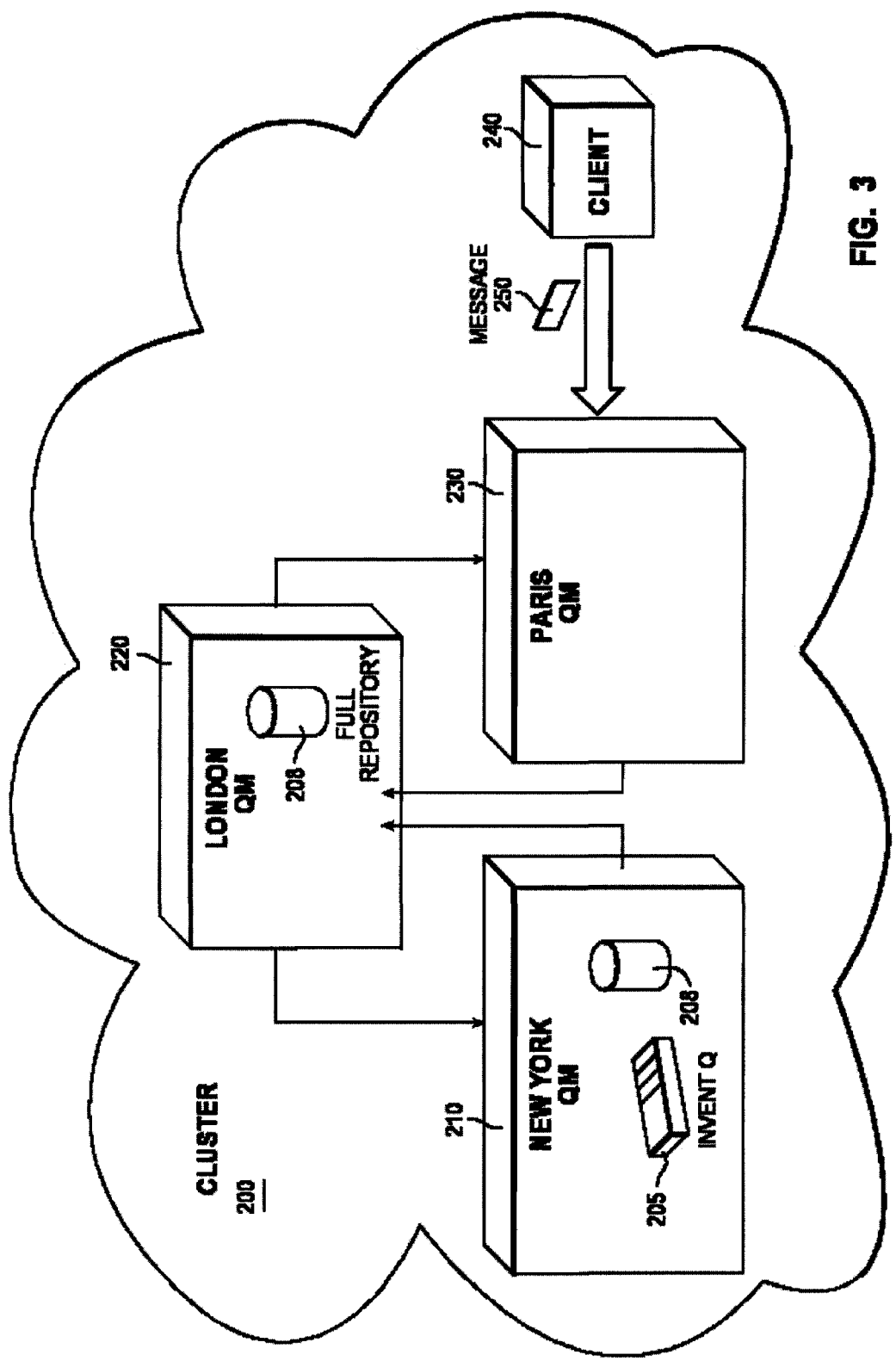
FIG. 3 shows a messaging system employing the clustering technique of the prior art.

It was partly for this reason that message clustering was invented. FIG. 3 provides an overview of message clustering according to the prior art. Queue managers that are associated in some way may be grouped together into a cluster 200. For example each queue manager 210, 220, 230 may represent a department store based in New York, London and Paris respectively. The New York queue manager 210 manages an inventory queue (InventQ) 205 which is defined as a cluster queue within cluster 200. Cluster queues are queues which are publicised to the cluster. One or more, preferably two, queue managers maintain "full repositories" 208 which contain information about all the cluster queues within a particular cluster. In this example, the New York and London queue managers hold the full repositories. The other queue managers in the cluster hold "partial repositories" (not shown). Thus when client 240 connects to the Paris queue manager 230 requesting that a message 250 is put to InventQ 205, Paris QM first checks its partial repository to see if it knows the location of InventQ 205. The partial repository contains information regarding queues for which Paris QM 230 has previously had requests. If Paris has never previously been asked to transmit a message to InventQ 205, it contacts one of the queue managers containing a full repository 210; 220. Typically each partial repository queue manager chooses one such full repository queue manager and always makes a connection to that queue manager. In this example, Paris's elected queue manager is London QM 230. The Paris QM therefore connects to London to discover the location of InventQ 205 and having discovered this information Paris is able to transmit the message 250 to its destination 205 on the NewYork QM 210.

Thus, in a preferred embodiment of the present invention, message clusters provide an effective way of locating queues within a messaging system since all queues defined as cluster queues are publicised to an associated cluster via the full repositories. Other partial repository queue managers can locate such cluster queues by requesting location information from a full repository queue manager.

For more information about message clustering, please see IBM's MQSeries Queue Manager Clusters manual (SC34-5349-00), downloadable from http://www-3.ibm.com/software/ts/mqseries/library/mqp-dfs.html Thus in a preferred embodiment of the present invention where a messaging system such as WebSphere MQ is used as the transport mechanism in a distributed objects/services system, the infrastructure used to locate queues (i.e. message clustering) is applied to locate the objects/services in the distributed system. This advantageously avoids the need to maintain a separate directory structure for the location of objects/services.

FIG. 4 illustrates the components of a distributed services/object system according to a preferred embodiment of the present invention. Object servers 330 and 380 are grouped into cluster 300. Each Object server has a queue Object_Server defined 350; 400. (Note whilst this embodiment describes the queue 350; 400 having the same name on each object server 330; 380, this is not necessarily the case.) For each class of object 382; 385; 430; 440 implemented at an object server, a local alias queue is defined CLASS_<classid> (Class_Insurance; Class_Bank Class_Travel; Class_HireCars) 360; 370; 410; 420. (Note classid may be a class name or a class UUID (Universal Unique IDentifier).) Each local alias queue resolves to its local Object Server queue. For example, Class_Bank 370 resolves to Object Server queue 350. Each alias queue 360; 370; 410; 420 is defined as a cluster queue thereby publicizing it to queue managers within cluster 300. In other words, information regarding each alias queue's location is stored in any full repositories maintained within the cluster 300. (In this instance the information is stored within full repository 308). Object client 310 submits requests (methods) on cluster queues to its local queue manager 320 passing in appropriate parameters (e.g., Class_Bank(credit(S Todd, 100)). The local queue manager submits a request to its elected full repository queue manager (in this example, Object Server 380) and the information contained in full repository 308 directs local queue manager 320 to Object Server 330 on which the alias queue Class_Bank is located. A message is created pertaining to each request from an object client and this is mapped to the appropriate object_server queue 350. Each object server 330; 380 implements an agent program 340; 390 which reads messages off its object_server queue and processes them. Each agent knows the location of its local objects (e.g., Agent 340 knows the location of BANK 380 and INSURANCE 385) and can therefore execute the client's request (e.g., to credit S Todd's account with £100).

From the above, it should be appreciated that the use of message clustering in a preferred embodiment of the present invention provides an effective mechanism for locating not only queues but also objects/services.

Whilst FIG. 4 specifies that alias queues on a system each map to a single main queue (object_server), this is only an example configuration. It would also be possible for the alias queues to be real queues and for the agent program (or several instances thereof) 340; 390 to read messages off each real queue. However it should be appreciated that it is much easier (and less resource consuming) to have one agent instance (or several if the level of work demands it) reading messages off the one queue (i.e. object_server queue).

It will be appreciated that the term "service" encompasses the term "object".

It will be noted that the detailed description has mainly be concerned with the situation where the client is in the same cluster as the object server. This will not necessarily be the case. In the instance where the client and object server are in different clusters, standard MQ cluster joining techniques can be used. The same is true when the client is not within a cluster—standard techniques for putting a message to a queue within a cluster can be employed.

To summarise, preferred embodiments of the present invention provide a system whereby both queues and objects/services can be located using the same mechanism (messaging). All the advantages provided by the messaging system will thus also preferably apply to the location of objects/services. Thus, for example, the replication of information provided by the typical use of at least two full repositories in the message clustering scenario provides a backup for both queue information and object/services information. The security provided for by the messaging system is now applicable not just to the transport mechanism, but also to the object/services location mechanism (since they are now one in the same).

What is claimed is:

1. A method, in a data processing system, for sending a request for a target service to perform an operation, the method comprising the steps of:
   receiving a request for a target service to perform an operation;
   creating a message for a message queue, the message being representative of the request, the message including an indication of the message queue and the operation to perform, wherein the message queue represents and is associated with the target service;
   determining a location of said message queue, said message queue being a cluster queue in a messaging cluster; and
   sending the message to the message queue, wherein:
   the message queue is published to the messaging cluster such that the location of the message queue is stored in full repositories of the messaging cluster,
   determining the location of the message queue comprises requesting the location of the message queue from a full repository of the messaging cluster,
   sending the message to the message queue comprises using the location of the message queue retrieved from the full repository to direct the message to a data processing device in which the message queue is present,
   the queue is an alias queue that maps to a real queue and corresponds to a class object maintained in a server data processing device, and
   the server data processing device maintains a plurality of class objects having associated alias queues.

2. A data processing system for requesting a target service to perform an operation, the system comprising:
   a target service;
   means for receiving a request for the target service to perform an operation;
   means for creating a message representative of the request, said message including an indication of the target service and the operation to perform;
   a queue representing the target service, said queue being a cluster queue in a messaging cluster;
   means for determining a location of said queue;
   means, responsive to determining the location of said queue, for sending the message to said queue;
   an agent for reading the message from said queue; and
   means for performing the operation against the target service, wherein:
   the queue is published to the messaging cluster such that the location of the queue is stored in full repositories of the messaging cluster,
   the means for determining the location of the queue comprises means for requesting the location of the queue from a full repository of the messaging cluster, and
   the means for sending the message to the queue comprises means for using the location of the queue retrieved from the full repository to direct the message to a data processing device in which the queue is present, wherein said queue is an alias queue that maps to a real queue, said alias queue corresponding to a class object maintained in a server data processing device, and wherein the server data processing device maintains a plurality of class objects having associated alias queues.

3. The system of claim 2 comprising a plurality of alias queues, each queue representing a target service and mapping to the same real queue.

4. The system of claim 2 wherein the agent reads messages from the real queue.

5. A computer program product, in a computer readable medium, comprising program code which, when executed on a computer, causes the computer to:
   receive a request for a target service to perform an operation;
   create a message for a message queue, the message being representative of the request, the message including an indication of the message queue and the operation to perform, wherein the message queue represents and is associated with the target service;
   determine a location of said message queue, the message queue being a cluster queue in a messaging cluster; and
   send the message to the message queue, wherein:
   the message queue is published to the messaging cluster such that the location of the message queue is stored in full repositories of the messaging cluster,
   determining the location of the message queue comprises requesting the location of the message queue from a full repository of the messaging cluster,
   sending the message to the message queue comprises using the location of the message queue retrieved from the full repository to direct the message to a data processing device in which the message queue is present,
   the queue is an alias queue that maps to a real queue and corresponds to a class object maintained in a server data processing device, and
   the server data processing device maintains a plurality of class objects having associated alias queues.

6. An apparatus for sending a request for a target service to perform an operation, the apparatus comprising:
   means for receiving a request for a target service to perform an operation;
   means for creating a message for a message queue, the message being representative of the request, the message including an indication of the message queue and the operation to perform, wherein the message queue represents and is associated with the target service;
   means for determining the location of said message queue, said message queue being a cluster queue in a messaging cluster; and
   means for sending the message to the message queue, wherein:
   the message queue is published to the messaging cluster such that the location of the message queue is stored in full repositories of the messaging cluster,
   means for determining the location of the message queue comprises requesting the location of the message queue from a full repository of the messaging cluster, and
   means for sending the message to the message queue comprises using the location of the message queue retrieved from the full repository to direct the message to a data processing device in which the message queue is present, wherein said queue is an alias queue that maps to a real queue, said alias queue corresponding to a class object maintained in a server data processing device, and wherein the server data processing device maintains a plurality of class objects having associated alias queues.

7. The method of claim 1, further comprising:
redirecting the message from the alias queue to the real queue associated with the alias queue.

8. The method of claim 7, further comprising:
reading the message from the real queue; and
processing the message in a data processing system associated with the real queue using a class object corresponding to the message queue.

9. The method of claim 1, wherein a plurality of the alias queues associated with the plurality of class objects maintained in the server data processing device map to a same real queue of the server data processing device.

10. The data processing system of claim 2, further comprising:
means for redirecting the message from the alias queue to the real queue associated with the alias queue;
means for reading the message from the real queue; and
means for processing the message in a data processing system associated with the real queue using a class object corresponding to the alias queue.

11. The data processing system of claim 2, wherein a plurality of the alias queues associated with the plurality of class objects maintained in the server data processing device map to a same real queue of the server data processing device.

12. The apparatus of claim 6, further comprising:
means for redirecting the message from the alias queue to the real queue associated with the alias queue;
means for reading the message from the real queue; and
means for processing the message in a data processing system associated with the real queue using a class object corresponding to the alias queue.

13. The apparatus of claim 6, wherein a plurality of the alias queues associated with the plurality of class objects maintained in the server data processing device map to a same real queue of the server data processing device.

* * * * *